No. 702,101. Patented June 10, 1902.
E. KLEIN.
AXLE.
(Application filed Oct. 16, 1901.)
(No Model.)
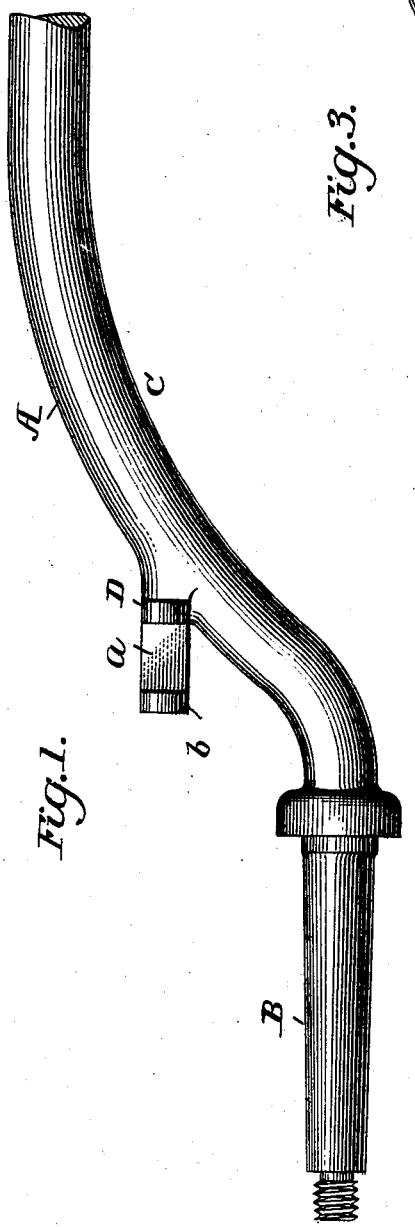
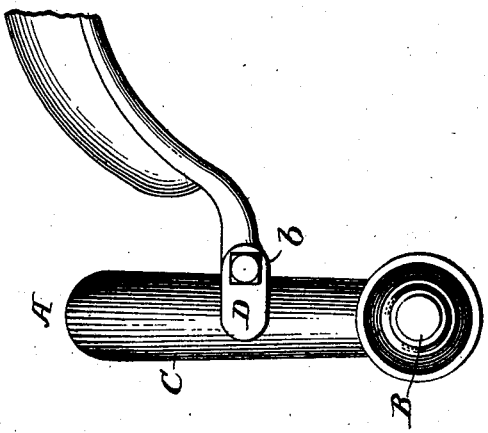
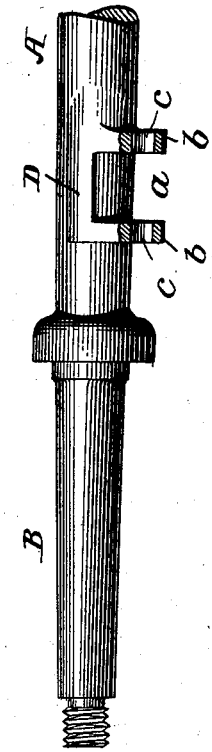
Inventor
Ernest Klein,
Witnesses.

UNITED STATES PATENT OFFICE.

ERNEST KLEIN, OF WILKESBARRE, PENNSYLVANIA.

AXLE.

SPECIFICATION forming part of Letters Patent No. 702,101, dated June 10, 1902.

Application filed October 16, 1901. Serial No. 78,893. (No model.)

*To all whom it may concern:*

Be it known that I, ERNEST KLEIN, a citizen of the United States, residing at Wilkesbarre, Luzerne county, State of Pennsylvania, have invented certain new and useful Improvements in Axles, of which the following is a specification.

My invention relates to carriage and wagon axles, but more particularly to an improved appliance or device for attaching shafts to a naked arched axle of any form, as axles known and designated by the trade as axles for "runabout" wagons or popularly known as "bike" axles or any form of axle to which it could be practically applied; and it consists of a construction illustrated in the accompanying drawings and more fully described in the specification.

In the drawings, Figure 1 is a side view of an arched axle embodying my invention. Fig. 2 is a top view thereof; and Fig. 3 is an end view of the axle, showing part of a shaft coupled thereto.

Referring to the drawings, A represents an axle, shown as an arched axle, which may be of any suitable material, as steel or iron. The axle is formed with bearing portions B B for the wheels and with an arched portion C. To the sides of the arch C of the axle are connected coupling lugs or arms D D. These coupling lugs or arms project laterally from each side of the slope of the arch, and, as shown, they extend substantially horizontally. The lugs D are preferably formed integral with the axle, as by being forged thereon, and each lug is provided with a recess $a$, formed between parallel perforated ears $b$, projecting forwardly from the axle, the perforations being indicated by $c$, for the reception of suitable coupling-pins.

While it is my intention that the lug embodying my invention shall be forged solid with the axle, I do not deny myself the privilege of welding, brazing, or attaching it to the axle by any secure process. The shafts are then adapted to be coupled to the lugs D, the end of the shaft, as shown in Fig. 3, entering the recess in a lug. Broadly speaking, my invention consists in providing the sides of the arch of the axle with the laterally-projecting lugs or arms D D, of substantially the form and arrangement shown, for coupling the shafts; but I am not to be understood as limiting the invention to this particular form of lug, as different forms may be applicable varying somewhat from that shown; but the form of lug herein described is particularly applicable in the construction shown.

There are many obvious advantages in my construction over devices having a similar or the same object, among which may be noted securing greater strength than can be obtained with any of the various devices heretofore in use, my device being in the form of the clip commonly used on vehicles for the attachment of shafts and in a form or shape to secure the greatest possible strength and at the same time the form most readily adapted for the use of any of the various forms of couplings used for the attachment of shafts to vehicles.

Without limiting myself to the precise details of construction shown and described, I claim and desire to secure by Letters Patent—

An arched axle having integral therewith arms projecting laterally from the arched portion of the axle, and two parallel forwardly-projecting perforated ears on each arm, substantially as described.

In testimony whereof I have signed my name to this specification in the presence of two subscribing witnesses.

ERNEST KLEIN.

Witnesses:
C. H. GILLAM,
J. F. ARMSTRONG.